United States Patent
Grieser et al.

[19]

[11] Patent Number: 6,142,700
[45] Date of Patent: *Nov. 7, 2000

[54] JOINT FORMING DEVICES

[75] Inventors: Jerry D. Grieser, Archbold; Richard A. Nelson, Napoleon; Steven R. Munday, Stryker, all of Ohio; William E. T. Vallance, Marlow, United Kingdom

[73] Assignee: Titus International PLC, Buckinghamshire, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/656,518

[22] Filed: May 30, 1996

[30] Foreign Application Priority Data

May 31, 1995 [GB] United Kingdom .................. 9511023

[51] Int. Cl.⁷ ...................................... F16D 1/00
[52] U.S. Cl. ................... 403/407.1; 403/297; 403/405.1
[58] Field of Search .............................. 403/405.1, 406.1, 403/407.1, 408.1, 297

[56] References Cited

U.S. PATENT DOCUMENTS

| | | | |
|---|---|---|---|
| 4,131,376 | 12/1978 | Busse ................................. | 403/297 X |
| 4,332,495 | 6/1982 | Bürgers . | |
| 4,518,278 | 5/1985 | Koch . | |
| 4,545,698 | 10/1985 | Koch ................................. | 403/407.1 X |
| 4,599,011 | 7/1986 | Tashiro et al. ........................ | 403/407.1 |
| 4,693,630 | 9/1987 | Giovannetti .......................... | 403/405.1 |
| 4,728,215 | 3/1988 | Martincic et al. ................ | 403/407.1 X |
| 4,810,127 | 3/1989 | Hettich ................................. | 403/407.1 |
| 5,143,473 | 9/1992 | Harley . | |
| 5,284,401 | 2/1994 | Harley ............................. | 403/407.1 X |

FOREIGN PATENT DOCUMENTS

| | | |
|---|---|---|
| 0378118 | 7/1990 | European Pat. Off. ............ 403/407.1 |
| 794608 | 5/1958 | United Kingdom . |
| 1009985 | 11/1965 | United Kingdom . |
| 1174319 | 12/1969 | United Kingdom . |
| 1571697 | 7/1980 | United Kingdom . |
| 1573172 | 8/1980 | United Kingdom . |
| 2040385 | 8/1980 | United Kingdom . |
| 1582761 | 1/1981 | United Kingdom . |
| 2074282A | 10/1981 | United Kingdom . |
| 2199052A | 11/1983 | United Kingdom . |
| 2199053A | 11/1983 | United Kingdom . |
| 2172076A | 9/1986 | United Kingdom . |
| 2241299B | 8/1991 | United Kingdom . |
| 2246826A | 2/1992 | United Kingdom . |
| 2277973 | 11/1994 | United Kingdom . |
| 2285106 | 6/1995 | United Kingdom . |

*Primary Examiner*—Terry Lee Melius
*Assistant Examiner*—William L. Miller
*Attorney, Agent, or Firm*—Emch, Schaffer, Schaub & Porcello Co., L.P.A.

[57] ABSTRACT

A joint forming device for forming a joint between two members, the device (10) comprising a tightening element (12) to be fitted to one member and a fastening element (14) having a longitudinal axis (34) to be fitted to the other member. The fastening element has at least one engaging surface (26) cooperably engageable with a respective arcuate camming surface (24) of the tightening element whereby rotation of the tightening element in one sense about an axis of rotation thereof causes axial movement of the fastening element towards the axis of rotation to cause a joint formed between the two members to tighten. The or each arcuate camming surface (24) is adapted such that the relation between the amount of rotation of the tightening element and the amount of axial movement it causes is substantially constant substantially throughout the range of axial movement of the tightening element. The device further comprises formations (84, 86) for resisting rotation of the tightening element about its axis of rotation at least in the sense opposite to the sense in which it is rotated to cause tightening of the joint.

13 Claims, 3 Drawing Sheets

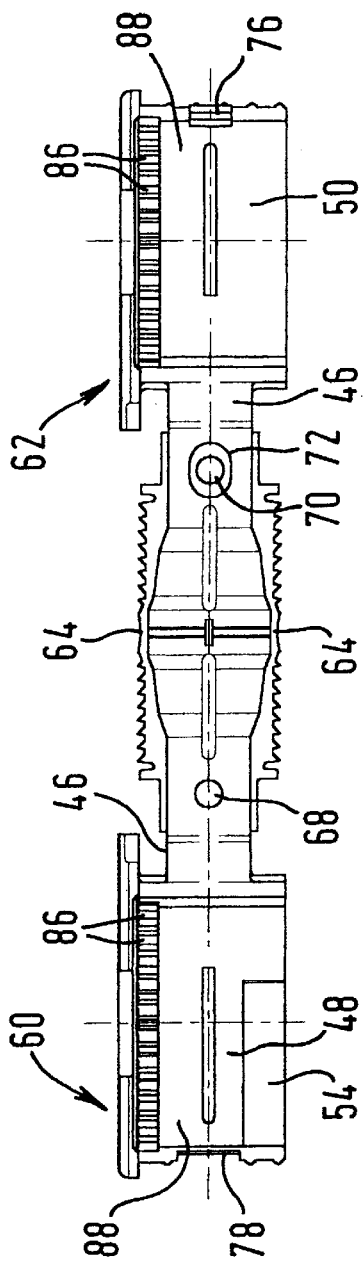
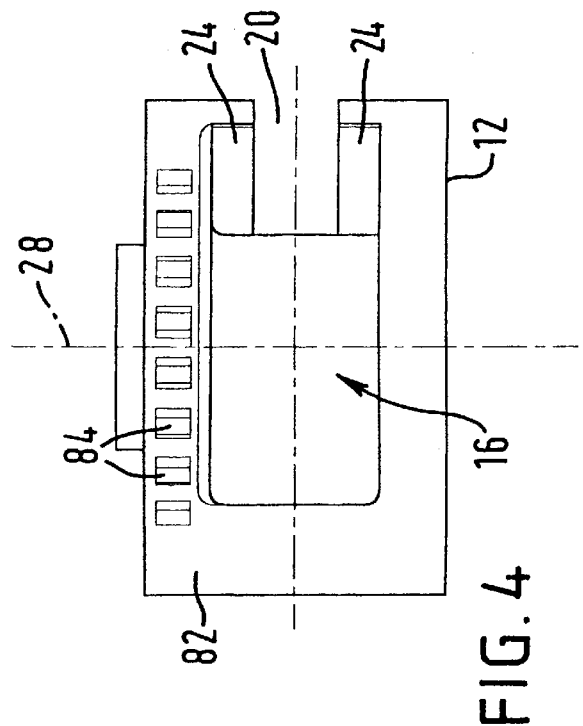

JOINT FORMING DEVICES

The invention relates to joint forming devices.

A known joint forming device for forming a joint between two members, or panels, of an item of knock-down furniture comprises a fastening element in the form of an elongate pin which is screwed into one panel and a tightening element in the form of a rotatable drum-like camming element which is fitted in a recess in the other panel such that its arcuate camming surfaces can engage with a head portion of the pin. The recess for the camming element is formed in a major surface of the panel and is typically spaced a small distance from one edge of the panel. Access for the pin is provided by a bore extending from said edge of the panel to the recess. Alternatively, in order to reduce the number of machining operations on the panel which receives the camming element, it is known to form the recess therefor such that the recess opens at said edge of the panel.

A joint can be formed between the two panels by bringing them together so that the head portion is received in the camming element and rotating the camming element. The camming surfaces grip the head portion and as the camming element is rotated in one sense about the axis of rotation thereof axial movement of the pin towards said axis of rotation is caused thereby drawing the two panels together. Such a joint forming device is known, for example, from GB 2241299B.

Typically, the camming surfaces of known camming elements have a lengthwise profile adapted to provide a two-phase tightening action. In the first phase, a relatively "coarse movement" of the pin is provided by portions of the camming surfaces having a relatively steep, or tight, curve, i.e. a curvature adapted to provide a relatively large amount of axial movement of the pin for a relatively small amount of rotation of the camming element. This "coarse movement" is provided for closing a gap between the two panels and causing them to be tightly pressed together, a movement often referred to as pull-up. The second phase of pin movement is caused by portions of the camming surfaces having a relatively flatter curve. The second-phase movement increases the compressive force on the joint and the reduced curvature of the camming surfaces imparts a degree of self-locking, often referred to as lock-up, to the joint forming device. It will be appreciated that the steeper the curve of the camming surfaces at the point of engagement with the head portion of the pin, the more likely it is that the camming element will back-off, i.e. rotate in the sense opposite to the sense in which it is rotated in order to tighten the joint, when the panels are loaded in use. Accordingly, camming elements designed to provide the above-described two-phase pin movement are intended to be rotated sufficiently during tightening of the joint to ensure engagement between the head portion of the pin and the flatter portions of the camming surfaces so as to obtain the so-called lock-up.

This arrangement has two disadvantages. The first disadvantage is that the person assembling the joint is required to impart a significant amount of rotation to the camming element in order to form the joint and obtain lock-up; typically in excess of 180° of rotation. This is time consuming and tiring for the assembler having to form many such joints. The second disadvantage is that if the recess for the tightening element is formed too close to the edge of the panel, the joint may be made (and the assembler find it extremely difficult to rotate the tightening element) before the head portion of the pin is in engagement with the flatter portions of the camming surfaces thus increasing the likelihood, that the joint will loosen due to back-off of the tightening element when the panels are loaded.

Many manufacturers of knock-down furniture would like to be able to provide the assembler with joint forming devices in which the so-called lock-up can be obtained at any point on the camming surfaces. This provides the possibility that if the panels, and in particular the recesses for the joint forming devices are manufactured to a tolerance sufficiently tight to ensure that when the joint is initially assembled, that is when the panels are brought together and the head portion of the pin is inserted into the camming element, there is no gap between the panels and therefore the joint can be tightened by minimal rotation of the camming element with little or no pull-up being required. For this arrangement to function satisfactorily, it is necessary to be able to obtain lock-up at substantially any point at which the engaging surfaces engage with the camming surfaces. In order to provide lock-up at any point on the camming surfaces, it is desirable to have linear camming surfaces, i.e. surfaces adapted such that the relation between the amount of rotation of the tightening element and the amount of axial movement of the pin caused thereby is substantially constant substantially throughout the range of said axial movement.

The design of linear camming surfaces for such a camming element is constrained by two factors: firstly, the need to provide sufficient axial movement of the pin to develop enough compression in a joint for it to be tightly made and to provide some pull-up to compensate for inaccuracy in the forming of the recess for the camming element; and secondly, the overall size of the camming element.

Typically known camming elements which provide a two-phase tightening action have a diameter of 12 to 18 mm. It has been found by the applicant that in order to provide such camming elements with linear camming surfaces which can provide useful amounts of pull-up and lock-up, the curvature of the camming surfaces whilst not as tight as the first-phase curvature of the camming surfaces of the known camming elements, cannot be reduced to the second-phase curvature of the known camming elements. It has been found that a camming element provided with such linear camming surfaces works satisfactorily in many circumstances and provides a joint forming device which has a nice "feel" as it locks-up. However, tests indicate that under adverse conditions the camming element can back-off.

In order to provide linear arcuate camming surfaces with a high degree of lock-up, a relatively large camming element is required. That is, to provide an arcuate camming surface having a lengthwise profile which is sufficiently flat to provide a high degree of lock-up and a reasonable range of axial movement of the pin, the size of the camming element must be increased relative to the size or known camming elements which provide a two-phase tightening action. However, it is not desirable to increase the size of camming elements for this purpose.

It is an object of the invention to at least in part overcome the above-described problems.

Accordingly, the invention provides a joint forming device for forming a joint between two members, the device comprising a tightening element to be fitted to one said member and a fastening element having a longitudinal axis to be fitted to the other said member, said fastening element having at least one engaging surface cooperably engageable with a respective arcuate camming surface of said tightening element whereby rotation of said tightening element in one sense about an axis of rotation thereof causes axial movement of said fastening element towards said axis of rotation to cause a joint formed between said two members to tighten, the or each arcuate camming surface being adapted such that the relation between the amount of said rotation of the tightening element and the amount of said axial movement caused thereby is substantially constant substantially throughout the range of said axial movement and the device further comprising means for resisting rotation of the tightening element about said axis of rotation at least in the sense opposite to said one sense.

Preferably the resisting means is adapted to be operable in a plurality of rotational positions of said tightening element.

The device may comprise a housing for the tightening element in which case, the resisting means may comprise formations provided on said housing and/or said tightening element for respectively engaging with said tightening element or said housing.

In one embodiment, the tightening element is provided with said formations comprising protrusions disposed on an outer peripheral surface thereof and said housing is provided with said formations comprising depressions arranged to be cooperably engageable by said protrusions.

The resisting means may comprise formations provided on said fastening element for engaging with said tightening element.

The formations may comprise protrusions provided on a head portion of said fastening element.

The resisting means may comprise formations provided on said tightening element for engaging with said fastening element.

The formations of the tightening element may comprise depressions provided in the or each camming surface for cooperable engagement with said protrusions.

The resisting means may comprise the adaption of the or each engaging surface and the respective arcuate camming surface such that, in use, during such tightening an overlap of the or each engaging surface and the respective arcuate camming surface cooperably engaged therewith in a direction transverse the length of the arcuate camming surface tends to increase.

In the direction of said overlap, the or each engaging surface of said fastening element may extend radially outwardly and axially inwardly with respect to said longitudinal axis of the fastening element.

In said transverse direction, the or each camming surface extends axially inwardly and radially inwardly with respect to said axis of rotation of the tightening element.

In order that the invention may be well understood, some embodiments thereof, which are given by way of example only will now be described with reference to the accompanying drawings, in which:

FIG. 3 is a side view of a housing of the joint forming device in an open condition prior to installation of a fastening element and a tightening element therein;

FIG. 4 is a side view of the tightening element.

Referring to FIGS. 1 to 4, a joint forming device 10 comprises a tightening element 12 and a fastening element 14.

Figure 1:
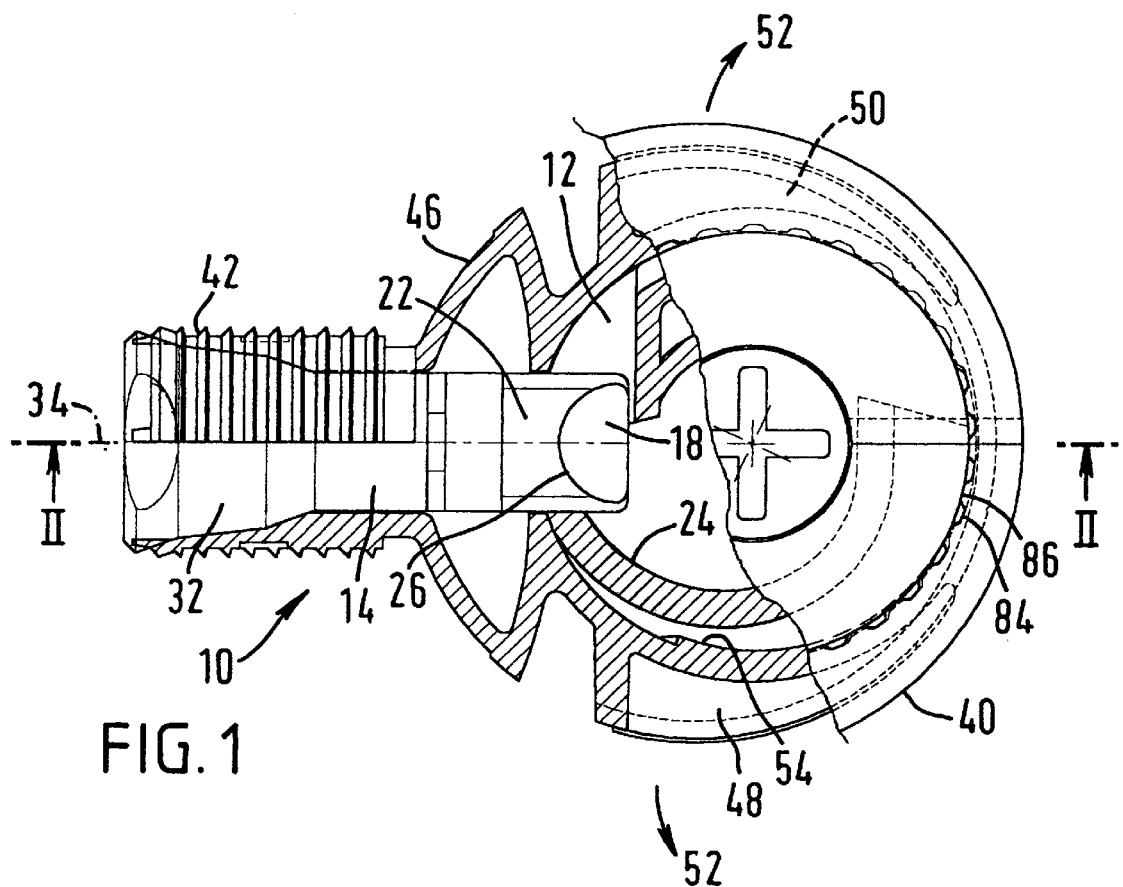
FIG. 1 is a partially sectioned top plan view of a joint forming device.
Figure 2:
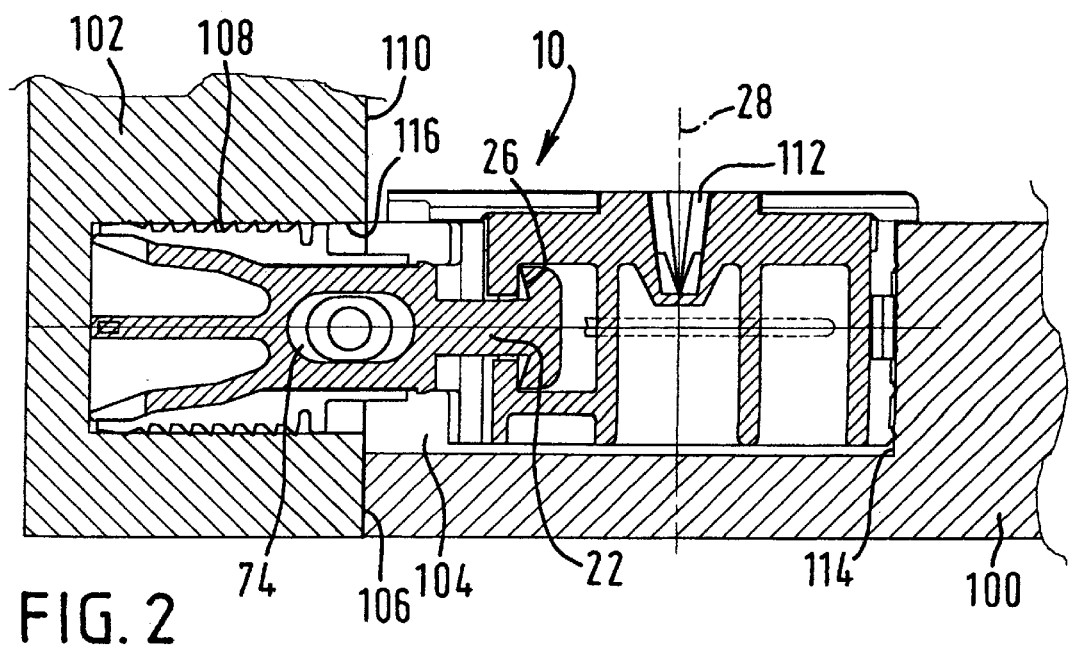
FIG. 2 is a section on line II—II in FIG. 1 showing the joint forming device fitted to two members of a joint.
Figure 5:
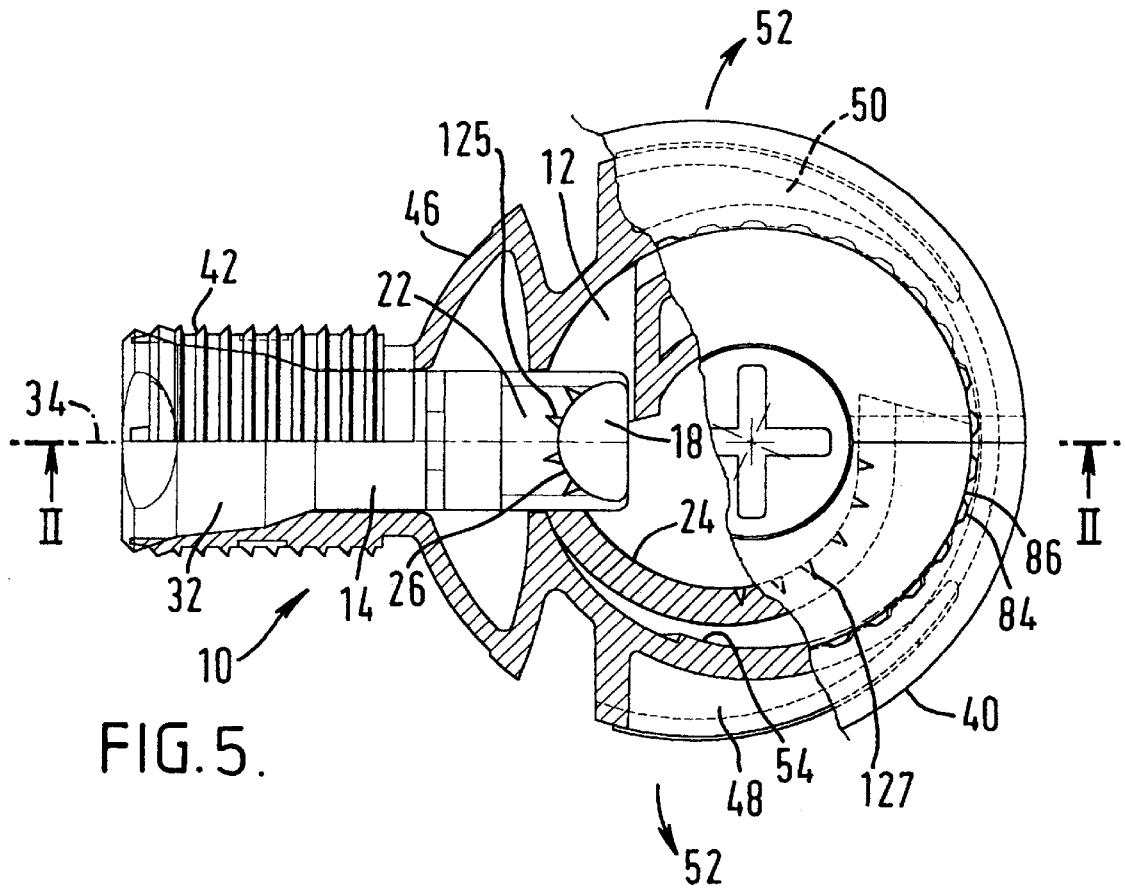
FIG. 5 is a view corresponding to FIG. 1 showing alternative resisting means for resisting rotation of the tightening element.

The tightening element 12 comprises a generally drum-like element having an opening 16 through which an engaging, or head, portion 18 of the fastening element 14 can be inserted into a hollow interior of the tightening element. A slot 20 extends from the opening partially circumferentially of the tightening element and is adapted to receive a neck portion 22 of the fastening element as shown in FIG. 2.

The tightening element 12 further comprises two arcuate camming surfaces 24 adapted to cooperably engage two discrete engaging surfaces 26 of the head portion 18 whereby rotation of the tightening element in a clockwise (as viewed in FIG. 1) sense causes axial movement of the fastening element towards the axis of rotation 28 of the tightening element. In a direction transverse the arcuate length thereof, the camming surfaces 24 extend axially; that is parallel to the axis of rotation 28.

The camming surfaces 24 are adapted such that the relation between the rotation of the tightening element about the axis of rotation 28 and the amount of axial movement caused thereby is constant substantially throughout the range of said axial movement. That is a linear camming action is provided. The linear camming action is obtained by arranging each of the camming surfaces 24 such that as it extends in its lengthwise direction about the axis of rotation 28 and the radial distance between the axis of rotation and the camming surface decreases at a constant rate. This arrangement can be seen in FIG. 1.

The fastening element 14 is an elongate pin member comprising a leading end portion which has a rectangular transverse cross-section extending from a multi-tapered expansion portion 32 which has a generally circular transverse cross-section. The leading end portion comprises the head portion 18 and neck portion 22 of the fastening element. The neck portion 22 is defined by opposed slots extending transversely of the longitudinal axis 34 of the fastening element. The engaging surfaces 26 are each defined by a wall of a respective one of the slots which define the neck portion 22 and have a length extending transversely of the longitudinal axis 34.

As shown in FIG. 2, the engaging surfaces 26, in a direction transverse the longitudinal axis 34, extend radially outwardly and axially inwardly with respect to the longitudinal axis 34. In effect the engaging surfaces are undercut in the transverse direction thereof.

The joint forming device further comprises means for housing the fastening element and tightening element. The housing means comprises a first housing 40 for the tightening element and a second housing 42 for the fastening element and means connecting the housings 40, 42. The connecting means comprises two opposed flexible membranes 46.

Each housing 40,42 is adapted to expand generally radially outwardly during rotation of the tightening element for forceably engaging walls of respective recesses in which, in use, they are fitted. The expansion of the first housing 40 is obtained by deflecting moveable portions 48, 50 of the housing in the general direction of the arrows 52 by means of an external cam on the tightening element and a cam 54 on the moveable portion 48. The expansion of the second housing 42 is obtained by pulling the expansion portion 32 into the second housing in the direction of the axis of rotation 28 during the Joint tightening process.

The housings 40, 42 and flexible membranes 46 are integral and can be manufactured as a one-piece split plastics moulding as shown in FIG. 3. In more detail the housing means comprises a first body part 60 and a second body part 62. Each body part 60, 62 defines one half of the housing means. More specifically, the body parts each define one half of the first and second housings 40, 42 and one flexible membrane 46 extending therebetween. The respective ends of the body parts 60,62 which define the halves of the second housing 42 are connected by hinge portions 64. The body parts can be folded together about the hinge portions 64 to the closed, use, condition shown in FIG. 1.

The body parts 60, 62 are adapted to be snap-fittable together and are shown with the first body part provided with a protrusion 68 which is snap-fittingly engageable in a bore 70 provided in a spigot 72 formed on the second body part 62. As shown in FIG. 2 the fastening element has a through-aperture 74 in which the protrusion 68 and spigot 72 are received when the expansion portion 32 is fitted into the second housing 42. At the end of the first housing remote from the second housing, the body part 62 is provided with a catch element 76 which extends in a generally circumferential direction of the sleeve portion for snap-fitting engagement with a recess, indicated at 78, in the first body part.

The joint forming device further comprises means for resisting rotation of the tightening element about the axis of rotation 28. The resisting means comprises formations provided on an outer peripheral surface 82 of the tightening element which formations comprise wedge-shaped protrusions 84. The protrusions 84 are arranged in two groups of circumferentially spaced protrusions. The groups of protrusions are spaced 180° apart, one such group being shown in FIG. 4.

The resisting means further comprises formations provided on the first housing 40 which formations comprise depressions 86 formed in an internal surface 88 of the first housing 40. The protrusions 84 and depressions 86 are arranged to be cooperably engageable when the tightening element is housed in the housing 40 in use.

In order to form a joint between two members 100, 102, the joint forming device 10 is installed in a recess 104 in the member 100 with the second housing 42 protruding from an edge 106 of the member 100. With the first housing thus installed in the recess 104, assembly of the joint is completed by moving the joint member 102 towards the edge 106 such that the second housing 42 enters a recess 108 formed in a major surface 110 of the member 102. Assembly is complete when the major surface 110 abuts the edge 106. The recess 108 is preferably sized to provide a close clearance fit for the second housing so that substantially no force is required in order to bring the two joint members together.

The joint thus assembled is tightened by rotating the tightening element 12 in a clockwise sense by means of a screwdriver inserted in a screwdriver slot 112 of the tightening element. Rotation of the tightening element causes the moveable portions 48, 50 to move in the direction of the arrows 52 so as to forcibly engage a wall 114 of the recess 104 whereby the first housing 40 is firmly fixed in the recess. Simultaneously, the fastening element is moved axially towards the axis of rotation 28 whereby the expansion portion 32 causes the second housing to expand generally radially outwardly to forcibly engage a wall 116 of the recess 108. With the housings 40,42 firmly fixed in their respective recesses further rotation of the tightening element generates a compressive force in the joint which is thus tightly made.

During the tightening process, the cooperable engagement of the protrusions 84 and depressions 86 provides a ratchet-like effect as the tightening element is rotated. Each ratchet step defines a locked position of the joint forming device. Accordingly, even under adverse loading conditions which might overcome the lock-up imparted by the profile of the camming surfaces 24, back-off is resisted. It will be appreciated that in order for back-off to occur, sufficient force must be generated to cause deformation of the protrusions and or the depressions to break the locking engagement therebetween.

A further feature of the embodiment is the undercutting of the engaging surface 26. As the joint is tightened, the forces generated tend to draw the camming surfaces 24 together in the general direction of the longitudinal axis 34 of the fastening element thereby tending to close the slot 20. It will be understood that this action tends to increase the transverse overlap between the camming and engaging surfaces applying a progressive clamping force to the fastening element thereby further increasing the size of the force which must be generated to cause back-off.

Referring to FIG. 2, it will be noted that the effect of the undercut is such that initial contact between the engaging surfaces 26 and the respective camming surfaces 24 is a line contact occurring at the respective free edges of the engaging surfaces. As described above, in forming a joint, the tightening element 12 is rotated in a clockwise sense to move the fastening element 14 axially towards the axis of rotation 28 of the tightening element. The axial movement of the fastening element relative to the housing 42 causes the housing to expand whereby it is fixed in the recess 108. With the housing 42 firmly fixed in its recess, further rotation of the tightening element causes the joint members to be pulled tightly together generating a compressive force in the joint. As the amount of pull exerted by the tightening element is increased the reaction force in the fastening element increases correspondingly and the engaging surfaces 26 tend to dig into the camming surfaces 24 at the point of engagement. It will be appreciated that the extent to which the engaging surfaces dig into the camming surfaces will depend on the geometry of the parts and the materials used to form same.

Since the engaging surfaces are undercut, as they dig into the camming surfaces they act like hooks and tend to pull the camming surfaces together. It will be appreciated that as the engaging surfaces dig into the camming surfaces, the extent of the cooperable engagement between the engaging surfaces and the respective camming surfaces in the direction of the overlap therebetween, which direction is generally perpendicular to the arcuate length of the camming surfaces, tends to increase.

It will be appreciated that in a joint made with the joint forming device 10, there are three features of the joint forming device which resist back-off of the tightening element: the lengthwise profile of the camming surfaces 24, the resisting means in the form of the cooperable protrusions and depressions 84,86 and the clamping force generated by the undercutting of the engaging surfaces 26.

Figure 6:
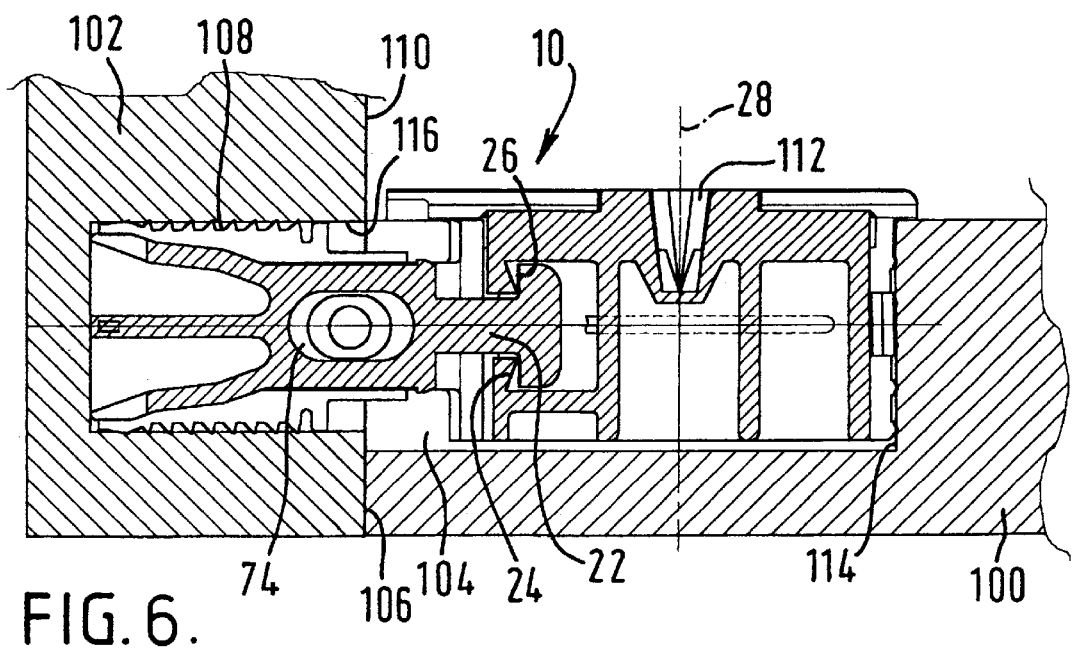
FIG. 6 is a view corresponding to FIG. 2 showing undercutting of the engaging surfaces of the fastening element and the camming surfaces of the tightening element.

With regard to the generation of a clamping force, it is to be understood that the camming surfaces may be undercut in addition to, or as an alternative to, undercutting the engaging surfaces. With reference to FIG. 6, it will be appreciated that undercutting the camming surfaces will provide surfaces which in a direction transverse the arcuate length thereof extend axially inwardly and radially inwardly with respect to the axis of rotation of said tightening element. These features are disclosed in the applicant's copending UK patent application (agent's reference number J.22863 GB) the disclosure of which is incorporated herein by reference.

It will be appreciated that the resisting means may take many forms. For example the protrusions may be provided on the first housing with complementary depressions being provided on the tightening element. Alternatively or additionally, formations may be provided on the fastening element for engaging with the tightening element. The formations on the fastening element may comprise protrusions provided on the head portion thereof and in particular the protrusions 125 may be provided on the engaging surfaces as shown in FIGS. The tightening element may be provided with formations for engaging with the fastening element and in particular these may take the form of depressions 127 provided in the camming surfaces for cooperable engagement with protrusions provided on the head portion of the fastening element.

It will be appreciated that by providing the joint forming device with means for resisting rotation of the tightening element in the sense opposite to the sense in which it is rotated in order to tighten a joint, it is possible for the tightening element to comprise substantially linear camming surfaces capable of providing a practically useful amount of pull-up and at the same time, for practical purposes, avoid the problem of increasing the size of the tightening element as compared with known camming elements which provide a two-phase tightening action.

What is claimed is:

1. A device for forming a joint between two members, said device comprising a tightening element having an axis of rotation to be fitted to one said member and a fastening element having a longitudinal axis to be fitted to the other said member, said fastening element comprising of female part to be at least partially received in a recess in said other member, and a male part having an expander region at a first end portion thereof adapted to be received in said female part, said expander region serving to expand said female part upon axial movement of said male part relative to said female part in a first direction to anchor said female part in said recess in said other member, said male part having at a second end portion thereof at least one engaging surface cooperably engageable with a respective arcuate camming surface of said tightening element whereby rotation of said tightening element in one sense about said axis of rotation thereof causes axial movement of said male part in said first direction towards said axis of rotation firstly to cause said female part to be anchored in said recess in said other member and then to pull said other member towards said one member and thereby cause the joint formed between said two members to tighten, each said arcuate camming surface having a continuous lengthwise profile having a predetermined curvature in which the radial distance of each said camming surface from said axis of rotation of said tightening element decreases at a predetermined constant rate substantially over the length of said profile, whereby rotation of said tightening element in said one sense causes said male part to move axially in said one direction at a rate which is substantially constant relative to said rate of rotation of said tightening element substantially throughout the range of said axial and rotational movements to produce a progressive, substantially linear tightening action for said joint, and said device further comprising means for resisting rotation of said tightening element about said axis of rotation at least in the sense opposite to said one sense.

2. The device as claimed in claim 1, wherein said resisting means is adapted to be operable in a plurality of rotational positions of said tightening element.

3. The device as claimed in claim 1, further comprising a housing for said tightening element, said resisting means comprising respective formations provided on said housing and said tightening element, said formations being cooperably interengageable to provide said resistance to rotation.

4. The device as claimed in claim 3, wherein said tightening element is provided with said formations comprising protrusions disposed on an outer peripheral surface thereof and said housing is provided with said formations comprising depressions arranged to be cooperably engageable by said protrusions.

5. The device as claimed in claim 1, wherein said resisting means comprises formations provided on said fastening element for engaging with said tightening element.

6. The device as claimed in claim 5, wherein said formations comprise protrusions provided on a head portion of said fastening element.

7. The device as claimed in claim 1, wherein said resisting means comprises formations provided on said tightening element for engaging with said fastening element.

8. The device as claimed in claim 1, wherein said resisting means comprises protrusions provided on a head portion of said fastening element and depressions provided on at least one said camming surface for cooperable engagement with said protrusions.

9. The device as claimed in claim 1, wherein each said arcuate camming surface has an arcuate length wherein said resisting means comprises the adaption of each said engaging surface and the respective arcuate camming surface Such that, in use, during Such tightening the extent of said cooperable engagement between each said engaging surface and the respective arcuate camming surface cooperably engaged therewith, in a direction of overlap of said surfaces which direction is generally perpendicular to said arcuate length tends to increase.

10. The device as claimed in claim 9, wherein in the direction of said overlap each said engaging surface of said fastening element extends from an inner edge thereof to an outer, free, edge thereof in a direction which is radially outwardly and axially inwardly with respect to said longitudinal axis of said fastening element.

11. The device as claimed in claim 9, wherein in the direction of said overlap, each said camming surface extends from an inner edge thereof to an outer, free, edge thereof in a direction which is axially inwardly and radially inwardly with respect to said axis of rotation of said tightening element.

12. The device as claimed in claim 1, wherein said resisting means comprising formations provided on said female part for engaging with said tightening element.

13. The device as claimed in claim 1, wherein said resisting means comprising formations provided on said tightening element for engaging with said female part.

* * * * *